April 11, 1950   J. H. KELLY ET AL   2,503,951
SHOE SOLE CONDITIONING CUTTER
Filed Sept. 13, 1948
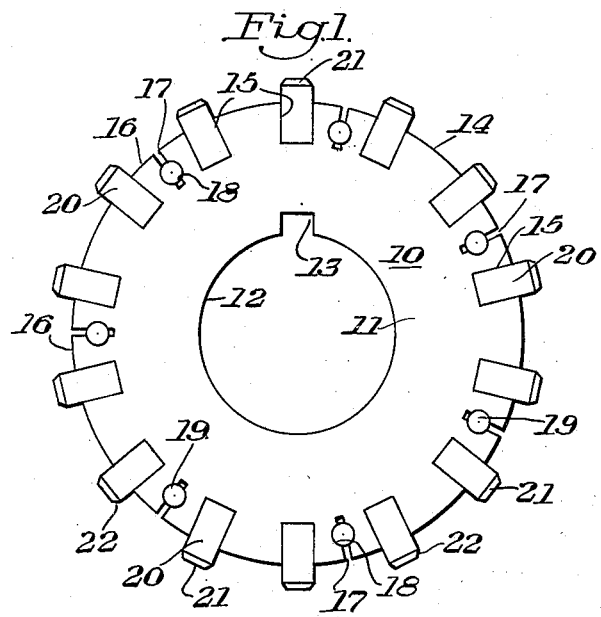
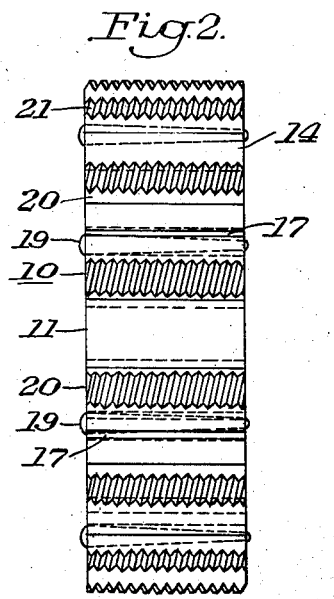
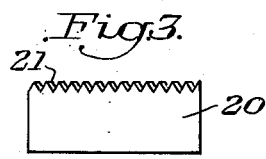
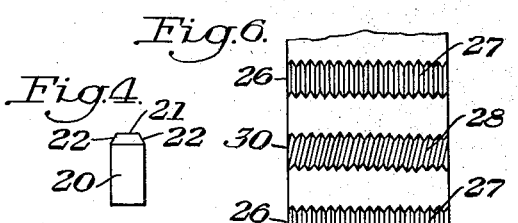
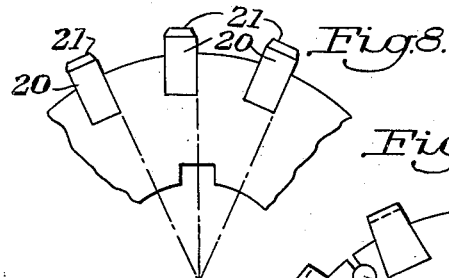
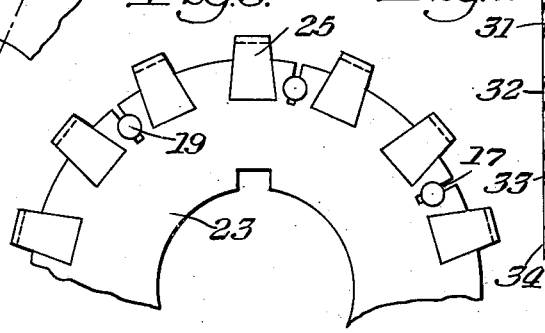
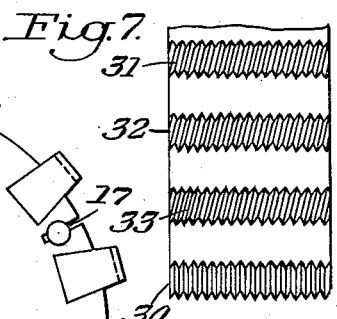
INVENTOR.
JOHN H. KELLY AND
BY HARRY H. TEAL
THEIR ATTORNEY Patented Apr. 11, 1950

2,503,951

UNITED STATES PATENT OFFICE 2,503,951

SHOE SOLE CONDITIONING CUTTER

John H. Kelly and Harry H. Teal, Pittsburgh, Pa.; said Teal assignor to said Kelly Application September 13, 1948, Serial No. 49,036

15 Claims. (Cl. 69—1)

This invention relates generally to the art of conditioning the surface of shoe soles made of leather or resinous material preparatory to the application of an adhesive for attaching the same to foot gear, and more particularly to a shoe sole conditioning cutter for producing a conditioned surface prior to the application of a cementitious substance thereto.

This invention is an improvement on the leather conditioning cutter disclosed in United States Letters Patent No. 2,429,822.

The surface conditioning cutter comprising this invention produces a uniform nap on the surface of the material thereby providing a myriad of fibers to which the adhesive can be applied for the purpose of attaching the same to another object such as foot gear. In the case of leather soles this cutter will completely remove flesh fibers and open up the nap of the close fibers exposing the firm porous body of the leather. The cutter comprising this invention will also remove the whole of the original surface of a resinous material and raise a uniform nap by cutting and plowing over the material on the surface engaged by the teeth of the cutter.

One of the principal objects of this invention is the provision of a conditioning cutter that is simple in structure and economical to manufacture and consists of a blank having an annular series of spaced flutes arranged to receive segments of hard material, such as tungsten carbide, having a series of teeth in the outer surface thereof. These segments may be firmly held against the bottom of the flutes of the blank and wedges are forced into complementary slots positioned between alternate flutes to clamp the segments and permit ready removal of the segments for sharpening or replacement. The flutes and the segments may be of complementary dovetail shape to provide a positive locking of the segments in position on the blank.

Another important feature of this invention resides in the provision of a transverse series of teeth on the outer surface of each segment, the crests of which lie in a plane normal to a plane disposed radially of the axis of rotation of the body of the cutter. Depending upon whether the plane of the crests of the teeth is symmetrical to the radial plane or leads or lags the radial plane, the trailing portion of the teeth may be made to provide a different degree of plowing action in forming the napped surface on the material.

Another important object of this invention lies in the fact that the series of teeth in the removable segments may be of any desired pitch and of any desired number of starts as compared to that of a thread or threads having one or more starts, in forming an annular series of teeth about the perimetral surface of the cutter. In following the teachings of this invention one not only can change the pitch of the teeth but can vary the pitch of the teeth on adjacent segments about a single cutter, which is particularly advantageous in this art. Thus, alternately projecting segments may be provided with a series of teeth that have no pitch and the remaining segments may each be provided with a series of teeth having the same or different pitch angle for the purpose of controlling the lateral thrust applied by the cutter on the material being conditioned.

Other objects and advantages appear hereinafter in the following description and claims.

The accompanying drawing shows, for the purpose of exemplification, without limiting the invention or claims thereto, certain practical embodiments of the invention wherein:

Fig. 1 is a view in end elevation of the preferred form of cutter comprising this invention;

Fig. 2 is a side elevation of the cutter shown in Fig. 1, illustrating the disposition of the teeth;

Fig. 3 is a side elevation of one of the segments shown in Fig. 1;

Fig. 4 is an end view of the segment shown in Fig. 3;

Fig. 5 is an end elevation of the modified form of the cutter with parts broken away;

Fig. 6 is a side elevation of a cutter with parts broken away illustrating alternate segments having teeth with no pitch with the other segments having teeth of the same pitch, parts of the cutter being broken away;

Fig. 7 is a view similar to Fig. 6 illustrating adjacent segments having teeth of different pitch; and Fig. 8 is an end elevation of a cutter showing the segments being positioned to one side of the spaced radial planes of the cutter body.

Referring to Fig. 1 of the drawings, the cutter 10 is made up of the cylindrical body blank 11 having a bore 12 with the key way 13 and a cylindrical perimetral surface 14 which is provided with an annular series of spaced flutes as indicated at 15. The annular series of flutes 15 are rectangular in cross section and extend for the full width of the body blank 11. Each of the flutes 15 are disposed symmetrically with reference to a radial plane passing therethrough.

In alternate land sections 16, between the flutes 15, the blank is provided with transverse slots 17 that pass through the tapered bores 18 arranged to receive the tapered pins 19.

Each flute 15 has mounted therein a segment 20 preferably made of a hard metal, such as tungsten carbide, and provided with a series of teeth 21 on the outer flat surface thereof. As shown in Figs. 1 to 4 the ends of the teeth 21 are provided with a negative rake 22 and when the segments are mounted in the flutes 15, as shown in Figs. 1 and 2, the crests of the teeth 21 lie in planes normal to the radial planes bisecting the flutes and their respective tooth sectors when the tooth sectors 20 are properly positioned in the flute on each side of the slot 17. The tapered wedge pin 19 may be driven into the tapered bore 18 causing the wedging action to force the metal or material of the body laterally of the pin and thus grip and lock the adjacent sectors 20 in position. With this arrangement only one tapered bore and wedge pin is needed for every two sectors 20. This construction permits each tooth sector to be removed for resharpening or replacement without disturbing the other tooth sectors in the cutter.

As shown in Fig. 2 the threads 21 appear to provide a left hand thread as the crests of the teeth lie in parallel planes extending from the lower left hand side of the figure to the upper right hand side of the figure. This pitch angle can of course be changed to any angle desired for the purpose of producing a different character of napped surfaces on materials. The sectors 20 may be clamped together in a grinding machine so as to form a flat continuous surface, and the grinding wheel, in forming the teeth, can then pass over the outer surfaces of the sectors and produce the teeth on the outer surfaces of all of the sectors with a single setting of the grinding machine.

It should be noted that the tooth segments 20 can be shimmed in the bottom of the flutes 15 when they are worn. However, it is desirable to maintain firm setting of these segments in the bottom of the flutes regardless of their shape.

As shown in Fig. 5 the body 23 is provided with flutes 24 of dovetail cross section for receiving the complementary shaped tooth segments 25. This construction provides a positive lock for the tooth segment in the flute. The converging sides of the flutes 24 may be disposed at a very slight angle to the radial plane bisecting the flute. However, for the purpose of this disclosure, it was deemed advisable to illustrate an angle of sufficient degree that would clearly demonstrate the principle of positive locking of the tooth segments in the body of the cutter.

As previously stated the teeth 21 on the segments 20 of Fig. 2 are all of the same pitch angle. However, in Fig. 6, the tooth segments 26 have teeth 27 which are disposed in parallel planes simulating a right hand thread; whereas the teeth 28 of the tooth segments 30 simulate a left hand thread and have less leads but are disposed at a pitch angle different from that illustrated in Fig. 2. This construction demonstrates that the lateral thrust producing action of alternate teeth in a cutter may be varied with respect to the teeth of the adjacent sectors or with respect to each other for the purpose of producing a conditioned surface having different nap characteristics. The alternate right hand threads 27 of the sectors 26 have more lead and provide a cutting action by their profiles and tend to counteract a portion of the thrust formed by the pitch angle of the teeth 28 of the segments 30. Thus, the teeth 28 of the segments 30 provide the thrust and plowing action to produce a nap in the conditioned surface and also provide a desired degree of thrust necessary for producing a napped surface of selected characteristics; whereas the teeth 27 trim the nap formed and prevent the edge of the sole from being frayed any fuzzy, which results from the greater pitch angle of the teeth 22.

In the structure of Fig. 7 the tooth sectors 31, 32, 33 and 34 each have teeth that are disposed at a different pitch angle. By properly selecting the segments having teeth of different pitch angles, one is enabled to fully control the thrust and the plowing action to produce the desired napped surface of the material being worked. The greater pitch angle of the teeth produces a greater thrust during the time that these teeth are in contact with the material. However, the spacing of the segments and the speed of the cutter must also be taken into account in making the proper selection of tooth segments having teeth of different pitch angles.

When the cutting profile in the leading face of each tooth sector enters the material it actually cuts the material producing a groove and the crests of the teeth have a pitch. They do not follow the groove but plow over the side of the groove. Since the material is held against lateral movement, the teeth roll up a fiberous nap in plowing over the side of the groove. When the crests of the teeth are arcuate and lie in a common cylinder, such as disclosed in Patent No. 2,429,822, the whole of the tooth is effective in plowing against the side of the groove formed by the profile in rolling up the nap. When the teeth are flat, as shown in the disclosure, the flanks of the teeth adjacent their leading and trailing edges produce a greater thrust and plowing action than that of the intermediate portion of the tooth and thereby produce a finer napped surface than that of the arcuately shaped tooth.

The toothed segments as shown in Figs. 1 and 5 are bisected by spaced radial planes; whereas, in the structure illustrated in Fig. 8, the radial planes are normal to the outer toothed surface of the segments 20 but are disposed on one side of these radial planes. If the cutter of this construction is rotated in a clockwise direction, as shown in Fig. 8, the leading face or cutting profile of the teeth will lie substantially in the spaced radial planes, in which case the teeth will not cut as deeply into the surface of the material. However, a greater plowing action is produced by the trailing edge of the teeth.

If the cutter, Fig. 8, is reversed in rotation so as to cause it to move in a counterclockwise direction the cutting profiles of the teeth 21 lie in the face remote of the spaced radial planes and the cutting profiles of the teeth cut deeply into the material and the flanks of the teeth adjacent the cutting profiles function to produce a lateral thrust and plowing action which progressively decreases as the teeth move through the material towards their trailing edge which is substantially in the spaced radial planes. This construction thus provides a greater cutting with less thrust and a progressive reduction in the plowing action; whereas the contra is true when the structure of Fig. 8 is rotated in the opposite or clockwise direction. Thus, the single structure of Fig. 8 provides a dual structure when rotated in opposite directions during operation.

The conditioning cutter of this disclosure may advantageously be employed in the machine disclosed in our application for Letters Patent, Serial No. 39,654, filed July 20, 1948, for Shoe sole conditioning machine.

While, for clarity of explanation, certain preferred embodiments of this invention have been shown and described, it is to be understood that it is capable of many modifications, that changes in construction and arrangement may be made therein and that certain parts may be employed without the conjoint use of other parts and without departing from the spirit and scope of this invention.

We claim:

1. In a cutter for conditioning the surface of materials, the combination of a body arranged for rotation, an annular series of radial projections on said body, said projections disposed in spaced radial planes about the axis of the body with the outer surface of each projection normal to its respective radial plane, each projection having a face on each side of its outer surface, a series of teeth in the outer surface of each projection extending across said outer surface and forming a cutting profile in each face, the cutting profiles of each tooth in the faces of each projection being offset relative to one another.

2. In a cutter for conditioning the surface of materials, the combination of a body arranged for rotation, an annular series of radial projections on said body, said projections disposed in spaced radial planes about the axis of the body with the outer surface of each projection normal to its respective radial plane, each projection having a face on each side of its outer surface, a series of teeth in the outer surface of each projection extending with uniform depth across said outer surface and forming a cutting profile in each face, the cutting profiles of each tooth in the faces of each projection being offset relative to one another.

3. In a cutter for conditioning the surface of materials, the combination of a body arranged for rotation, an annular series of radial projections on said body, said projections disposed in spaced radial planes about the axis of the body with the outer surface of each projection normal to its respective radial plane, each projection having a face on each side of its outer surface, a series of teeth in the outer surface of each projection extending across said outer surface and forming a cutting profile in each face, the cutting profiles of the individual teeth on each projection being offset relative to the teeth on adjacent projections.

4. In a cutter for conditioning the surface of materials, the combination of a body arranged for rotation, an annular series of radial projections on said body, said projections disposed in spaced radial planes about the axis of the body with the outer surface of each projection normal to its respective radial plane, each projection having a face on each side of its outer surface, a series of teeth in the outer surface of each projection extending across said outer surface and forming a cutting profile in each face, cutting profiles in the faces of each projection having a negative rake.

5. In a cutter for conditioning the surface of materials, the combination of a body arranged for rotation, an annular series of radial projections on said body, said projections disposed in spaced radial planes about the axis of the body with the outer surfaces of each projection normal to its respective radial plane, each projection having a face on each side of its outer surface, a series of teeth in the outer surface of each projection extending from one face across said outer surface to the other face, the cutting profiles of the teeth in adjacent faces and in the faces of each projection being offset.

6. In a cutter for conditioning the surface of materials, the combination of a non-round body arranged for rotation, an annular series of interrupted thread-like helices having their crests lying in an annular series of flat planes each of which is normal to a respective annular series of spaced radial planes about the circumference of said non-round body to provide an annular series of cutting teeth.

7. In a cutter for conditioning the surface of materials, the combination of a non-round body arranged for rotation, an annular series of interrupted thread-like helices having their crests lying in an annular series of flat planes each of which is normal to a respective annular series of spaced radial planes about the circumference of said non-round body to provide an annular series of cutting teeth, the profiles of adjacent teeth in the annular series being offset relative to one another.

8. In a cutter for conditioning the surface of materials, the combination of a non-round body arranged for rotation, an annular series of interrupted thread-like helices having their crests lying in an annular series of flat planes each of which is normal to a respective annular series of spaced radial planes about the circumference of said non-round body to provide an annular series of cutting teeth, the profiles of adjacent teeth in the annular series and the profiles of each tooth being offset relative to one another.

9. In a cutter for conditioning the surface of materials, the combination of a non-round body arranged for rotation, an annular series of interrupted thread-like helices having their crests lying in an annular series of flat planes each of which is normal to a respective annular series of spaced radial planes about the circumference of said non-round body to provide an annular series of cutting teeth, the teeth of said annular series having the same pitch angle.

10. In a cutter for conditioning the surface of materials, the combination of a non-round body arranged for rotation, an annular series of interrupted thread-like helices having their crests lying in an annular series of flat planes each of which is normal to a respective annular series of spaced radial planes about the circumference of said non-round body to provide an annular series of cutting teeth, selected teeth of said annular series having different pitch angles.

11. In a cutter for conditioning the surface of materials, the combination of a non-round body arranged for rotation, an annular series of interrupted thread-like helices having their crests lying in an annular series of flat planes each of which is normal to a respective annular series of spaced radial planes about the circumference of said non-round body to provide an annular series of cutting teeth, alternate teeth of said annular series having their crests lying in planes normal to the axis of said body.

12. In a cutter for conditioning the surface of materials, the combination of a non-round body arranged for rotation, an annular series of interrupted thread-like helices having their crests lying in an annular series of flat planes each of which is normal to a respective annular series of spaced radial planes about the circumference of said non-round body to provide an annular series of cutting teeth, alternate teeth of said annular series having their crests lying in planes normal to the axis of said body and the remaining teeth having a selected pitch angle.

13. In a cutter for conditioning the surface of materials, the combination of a body arranged for rotation, an annular series of radial projections on said body, said projections disposed in spaced radial planes about the axis of the body with the outer surface of each projection normal to its respective radial plane, each projection having a face on each side of its outer surface, a series of teeth in the outer surface of each projection extending across said outer surface and forming a cutting profile in each face, the crests of the teeth of selected projections being centered relative to its respective radial plane.

14. In a cutter for conditioning the surface of materials, the combination of a body arranged for rotation, an annular series of radial projections on said body, said projections disposed in spaced radial planes about the axis of the body with the outer surface of each projection normal to its respective radial plane, each projection having a face on each side of its outer surface, a series of teeth in the outer surface of each projection extending across said outer surface and forming a cutting profile in each face, the crests of the teeth of selected projections leading their respective radial plane.

15. In a cutter for conditioning the surface of materials, the combination of a body arranged for rotation, an annular series of radial projections on said body, said projections disposed in spaced radial planes about the axis of the body with the outer surface of each projection normal to its respective radial plane, each projection having a face on each side of its outer surface, a series of teeth in the outer surface of each projection extending across said outer surface and forming a cutting profile in each face, the crests of the teeth of selected projections lagging their respective radial planes.

JOHN H. KELLY.
HARRY H. TEAL.

REFERENCES CITED

The following references are of record in the file of this patent:

UNITED STATES PATENTS

| Number | Name | Date |
|---|---|---|
| 990,068 | Searless | Apr. 18, 1911 |
| 1,924,887 | Severson | Aug. 29, 1933 |
| 2,070,441 | McClenathan | Feb. 9, 1937 |